US 8,972,384 B2

(12) United States Patent
Thazhathekalam et al.

(10) Patent No.: US 8,972,384 B2
(45) Date of Patent: Mar. 3, 2015

(54) AUTOMATIC INFORMATION PRESENTATION OF DATA AND ACTIONS IN SEARCH RESULTS

(75) Inventors: Krishnan Thazhathekalam, Mountain House, CA (US); David D. Ahn, San Francisco, CA (US); Andrea Burbank, Chicago, IL (US); Franco Salvetti, San Francisco, CA (US); Christopher Jon Jewell, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 86 days.

(21) Appl. No.: 13/239,403

(22) Filed: Sep. 22, 2011

(65) Prior Publication Data

US 2013/0080419 A1    Mar. 28, 2013

(51) Int. Cl.
*G06F 17/30* (2006.01)

(52) U.S. Cl.
CPC .... *G06F 17/30864* (2013.01); *G06F 17/30696* (2013.01)
USPC ............ 707/722; 707/706; 715/230; 715/761

(58) Field of Classification Search
CPC .................... G06F 17/30386; G06F 17/30398; G06F 17/30554; G06F 17/30716
USPC ............................ 707/706, 722; 715/230, 761
See application file for complete search history.

(56) References Cited

U.S. PATENT DOCUMENTS

| 7,788,590 | B2 | 8/2010 | Taboada et al. | |
| 8,078,603 | B1 * | 12/2011 | Chandratillake et al. | ..... 707/706 |
| 8,332,393 | B2 * | 12/2012 | Elyada | .......................... 707/722 |
| 2006/0117067 | A1 * | 6/2006 | Wright et al. | .............. 707/104.1 |
| 2009/0199082 | A1 | 8/2009 | Hollander et al. | |
| 2010/0082634 | A1 | 4/2010 | Leban | |
| 2010/0145934 | A1 | 6/2010 | Tran et al. | |
| 2010/0185651 | A1 * | 7/2010 | Crow et al. | ................... 707/769 |
| 2012/0096383 | A1 * | 4/2012 | Sakamoto et al. | ............ 715/772 |
| 2012/0131008 | A1 * | 5/2012 | Ahn et al. | ..................... 707/741 |

OTHER PUBLICATIONS

Cayzer, Steve, "Semantic Blogging: Spreading the Semantic Web Meme", Retrieved at <<http://www.hpl.hp.com/techreports/2004/HPL-2004-48.pdf>>, XML Europe, Apr. 18-21, 2004.
Ginsburg, Mark, "Annotate! A Tool for Collaborative Information Retrieval",—Published Date: Jun. 17-19, 1998 http://ieeexplore.ieee.org/stamp/stamp.jsp?tp=&arnumber=725675>>, Seventh IEEE International Workshops on Enabling Technologies: Infrastructure for Collaborative Enterprises, Jun. 17-19, 1988.
"How to Create a Mouse Capture Drop-down Menu", Retrieved at <<http://msdn.microsoft.com/en-us/library/ms537653(v=vs.85).aspx>>, Retrieved Date: Jun. 2, 2011.
"Task Dialog", Retrieved at <<http://msdn.microsoft.com/en-us/library/bb756938.aspx>>, Retrieved Date: Jun. 2, 2011.

* cited by examiner

*Primary Examiner* — Monica Pyo
(74) *Attorney, Agent, or Firm* — Dave Ream; Doug Barker; Mickey Minhas (57) ABSTRACT

Architecture that inserts one or more label items in search result entries. In addition to the typical search result caption (title, snippet, and link), the architecture includes the label component of one or more of the label items in the result entry. The number and type of label annotations are based on the query. When a particular label item is selected (e.g., hover, mouse click), a presentation component (e.g., expansion object, pop-up window) launches proximate to a label item in response to interaction with the label item and presents additional information from the target webpage. The additional information can include an action and data related to the search result entry and the target webpage. The data can be obtained from a data source other than the target webpage.

16 Claims, 12 Drawing Sheets

Lasagna Recipes - Allrecipes.com

| Ingredients ▲ | Directions ▼ | Nutrition ▼ | 4.5/5 rating · Reactions |

16 ingredients · 8 servings    — 402

1 (16 ounce) package chopped frozen broccoli, thawed and drained
1 cup mayonnaise
1 egg, beaten
1/4 cup onions, chopped
3 (10 ounce) packages frozen chopped broccoli
8 ounces shredded sharp Cheddar cheese
1/3 cup chopped fresh parsley
2 teaspoons dried basil
salt and pepper to taste ...

More on this page ed lasagna recipes otta, and Parmesan

— 404 story of lasagna asagnas

Tired of the same old lasagna recipe? Get help with your lasagna including vegetable, meat and cheese lasagnas from the experts at FoodNetwork.com.
www.foodnetwork.com/topics/lasagna

Gas dryer vs electric dryer which is better? - Yahoo! Answers

Answers ▼   Question ▼   Resolved · 8 total answers

Best Answer: Depending on where you live will dictate which is more expensive to operate. The gas dryers of today use a hot surface ignitor to light the gas ...
answers.yahoo.com/question/index?qid=20080123063153AAHBAzG

Lasagna - Wikipedia, the free encyclopedia     Ingredients >
Lasagna (also spelled Lasagne) is a classic Italian pasta casserole     Directions >
dish which consists of alternate layers of pasta, cheese, a sauce,
and often other ingredients.
en.wikipedia.org/wiki/Lasagna Lasagna Recipes - Allrecipes.com     Ingredients >
Looking for lasagna recipes? Allrecipes has more than 180 trusted
lasagna recipes complete with ratings, reviews and cooking tips.
allrecipes.com/Recipes/Pasta/Lasagna/Main.aspx

AUTOMATIC INFORMATION PRESENTATION OF DATA AND ACTIONS IN SEARCH RESULTS

BACKGROUND

Search results of a web search are typically collected and returned to a results page. A search result can be described as comprising a caption. The caption includes a title, snippet, and link (e.g., uniform resource locator, or URL) to the target webpage associated with the search result. In addition, captions can contain additional information about the page or the entity it describes in a hover preview. However, existing hover previews lack discoverability—no indication that hover is present is shown until the user "mouses over" the far right side of the caption—and predictability—the content of the hover preview varies dramatically from page to page. These flaws lead to poor user engagement, at least with respect to a hover preview.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture inserts one or more label items in search result entries. The number and type of label annotations are based on the query. In addition to the typical search result caption (title, snippet, and link), the architecture includes the label component of one or more of the label items in the result entry.

When a particular label item is selected (e.g., hover, mouse click), a presentation component (e.g., expansion object, pop-up window) launches proximate to a label item in response to interaction with the label item and presents additional information from the target webpage. The additional information can include an action and data related to the search result entry and the target webpage. The data can be obtained from a data source other than the target webpage.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

The disclosed architecture facilitates the creation, insertion, and interaction of a label component in web search result entries. The label component includes one or more label items that are generated based on the query. The label items are also annotated based on the query. When selected by a user (interaction), a label item causes a presentation component such as an expansion object or pop-up window to be presented with additional information related to the specific label item. The information is directly relevant to the target webpage and complements the search result entry (title, snippet, and URL), provides the user with more context, and aids in task completion.

The label items can be interactive (respond to clicks or hovers) items on a metadata line of the caption that display information not typically found in the regular caption. (However, it is to be understood that the labels can be located elsewhere in the caption (e.g., to the left or right, above or below, etc.)) When the user clicks or hovers a label item in the metadata line, the user perceives a lightweight popup or expansion. Thus, the architecture enables improved discoverability by using the labels. Additionally, the label annotation enables clearly named labels such that the user is given a clear indication of the function and content to expect when selecting it.

The label items increase user satisfaction and the perceived relevance of the search entry result page by directly answering the question of the user, and improving the user's ability to determine which results on the results page are most relevant.

Data that is extracted from off-page sources but is related to the user's underlying task can be displayed. Moreover, related information from disparate sources can be grouped in a single location (the label component) and enables the user to complete a task with fewer queries.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
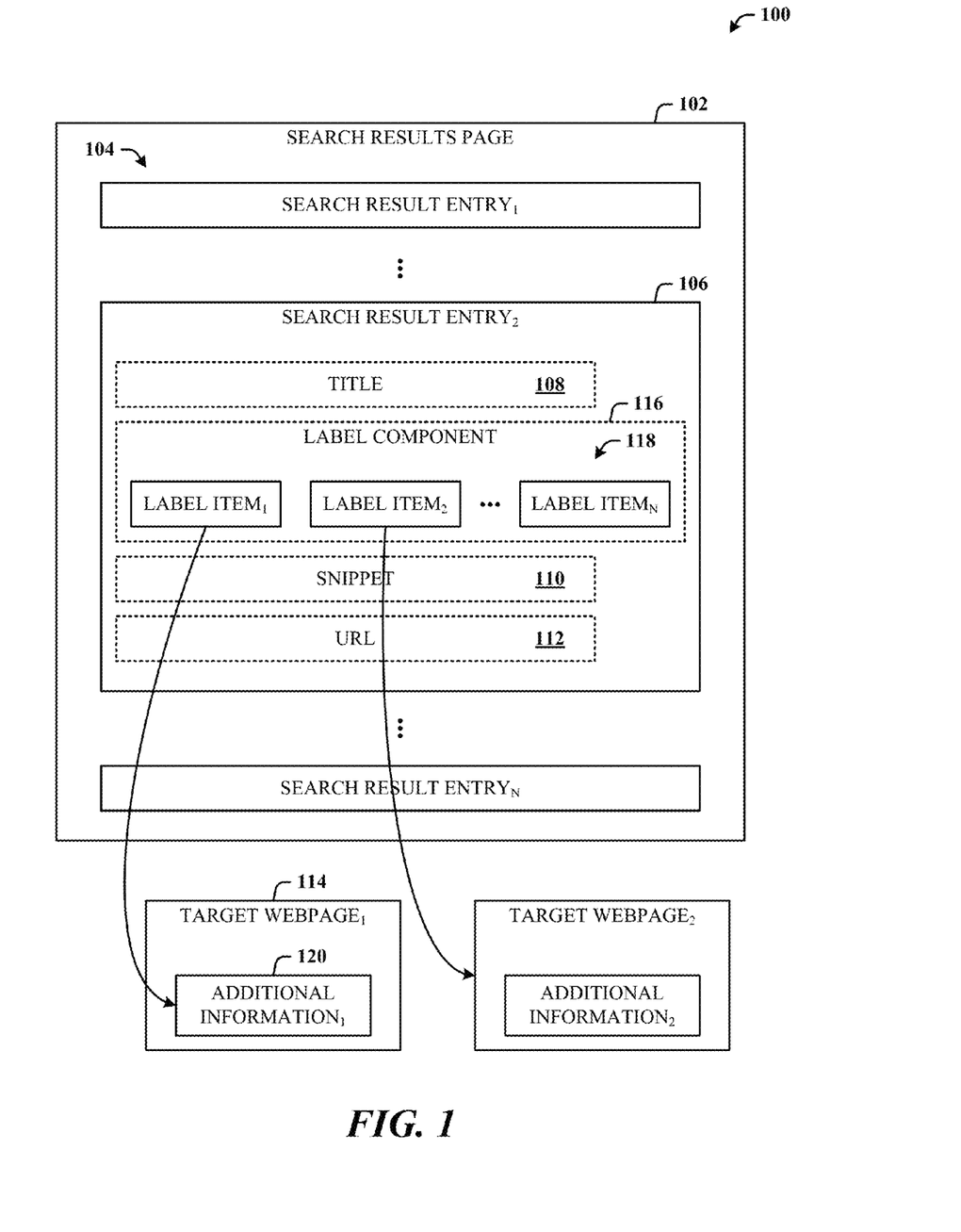
FIG. 1 illustrates a system of data and/or actions access and presentation in accordance with the disclosed architecture.

FIG. 1 illustrates a system 100 of data and/or actions access and presentation in accordance with the disclosed architecture. The system 100 includes a search results page 102 via which multiple search result entries 104 can be presented. A search result entry 106 includes a caption, which comprises a title 108, snippet 110 (a set of information from the target webpage 114, and related to the query processed by the search engine), and link 112 (e.g., uniform resource locator-URL) to a target webpage 114 associated with the search result entry 106.

The system 100 also includes a label component 116 presented in association with the search result entry 106. The search result entry 106 relates to the target webpage 114 (e.g., content of the page, entities of the page, concepts mentioned in the page), and the label component 116 includes one or more label items 118 that link to corresponding additional information 120 relevant to the target webpage 114. The label component 116 can be presented in a metadata line of the search result entry 106. The label items 118 each include a textual descriptor that relates to the additional information 120 to be presented by a presentation component. The label items 118 include an animated indicator that represents loading state during download of the additional information 120. The label items 118 include an error indicator that represents error state based on failure of download of the additional information 120.

Figure 2:
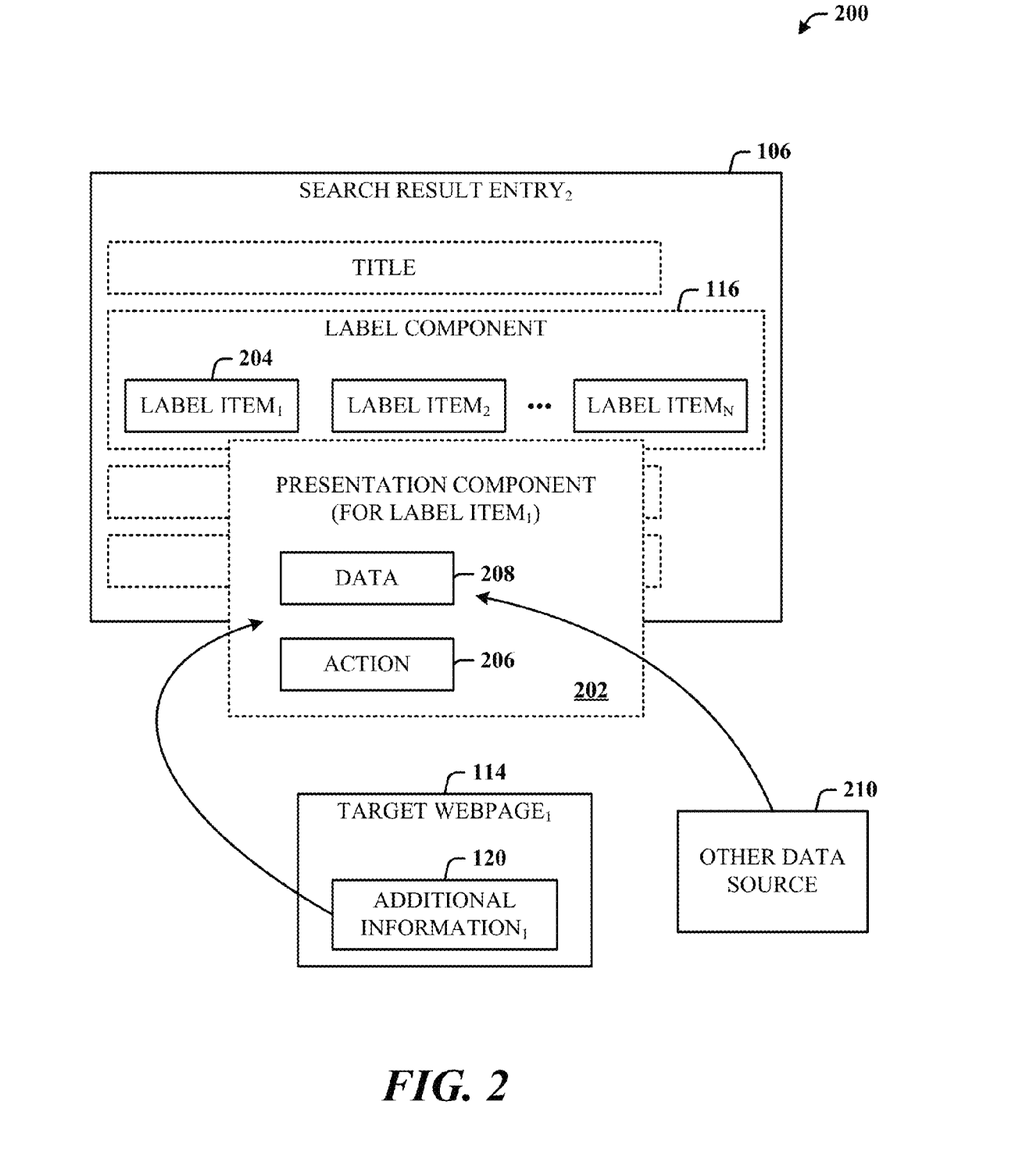
FIG. 2 illustrates a system that further includes a presentation component for presentation of the additional information.

FIG. 2 illustrates a system 200 that further includes a presentation component 202 for presentation of the additional information 120. The presentation component 202 launches proximate to a label item 204 in response to interaction with the label item 204 and presents the additional information 120 from the target webpage 114. The additional information 120 can include an action 206 related to the search result entry 104 and the target webpage 114. The additional information 120 can include data 208 obtained from a data source 210 other than the target webpage 114. The presentation component 202 can be a pop-up window or an expansion object, for example, that is presented proximate the associated label item 204 and that includes the additional information 120 (e.g., action 206, data 208).

Figure 3:
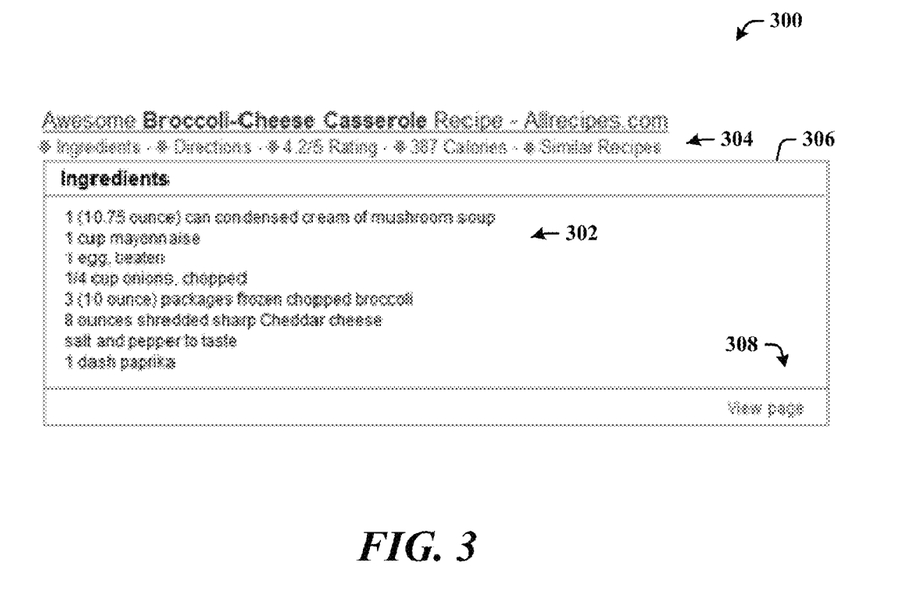
FIG. 3 illustrates a search result entry and additional information as presented in a pop-up window for a query.

FIG. 3 illustrates a search result entry 300 and additional information 302 as presented in a pop-up window for a query. The search result entry 300 is returned in response to a query that includes the terms broccoli, cheese, and casserole. Here, the label items 304 created, inserted, and annotated include Ingredients, Directions, Rating information, Calorie information, and Similar Recipes information, which are presented in the metadata line of the search result entry 300. A user has selected or hovered over the Ingredients label item, which then causes the Ingredients presentation component 306 to present the additional information 302. A View Page action 308 is also provided in the lower right corner of the presentation component 306.

Figure 4:
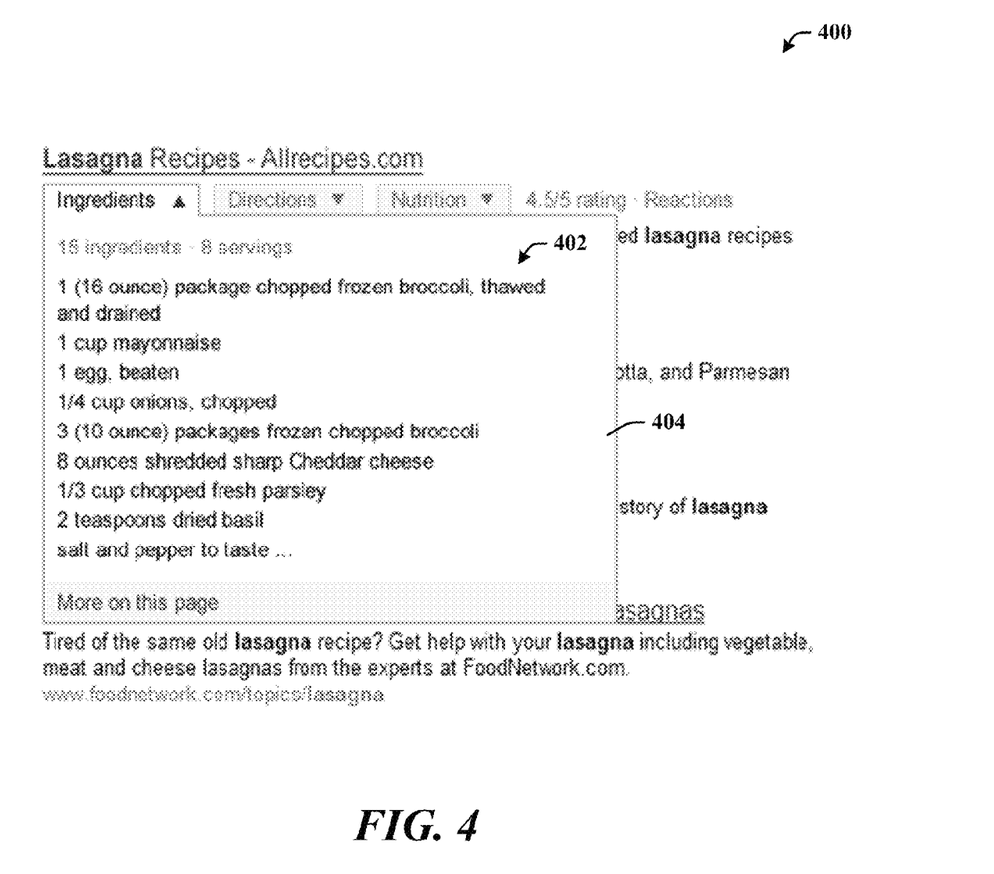
FIG. 4 illustrates a search result entry and additional information as presented in an expansion object for a query.

FIG. 4 illustrates a search result entry 400 and additional information 402 as presented in an expansion object 404 for a query. Here, the user has selected (e.g., hovered over) the Ingredients label item and the system responds by automatically showing the expansion object 404 with the additional information that includes the recipe, and actions that include a "More on this Page" link that when interacted with returns the webpage from which the additional information was retrieved.

Figure 5:
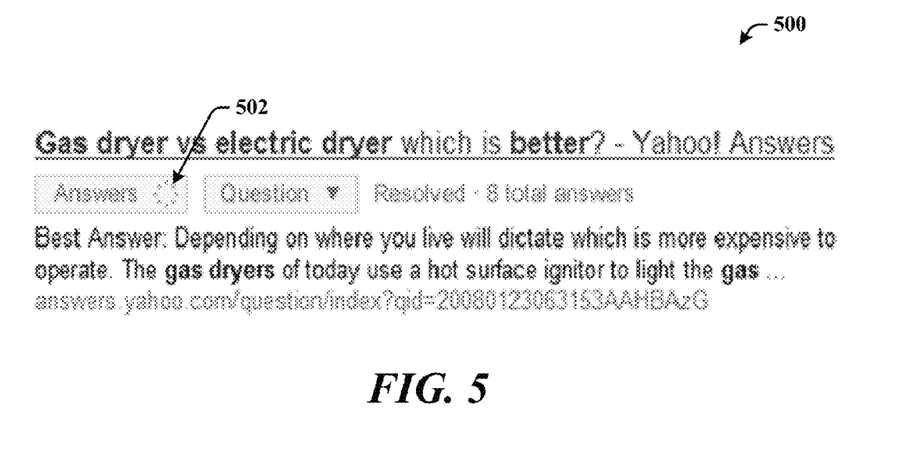
FIG. 5 illustrates a search result entry and animated label item during download of the additional information.

FIG. 5 illustrates a search result entry 500 and animated label item 502 during download of the additional information.

Here, the animated indicator is a circular image (e.g., GIF) applied to the annotated label item 502.

Figure 6:
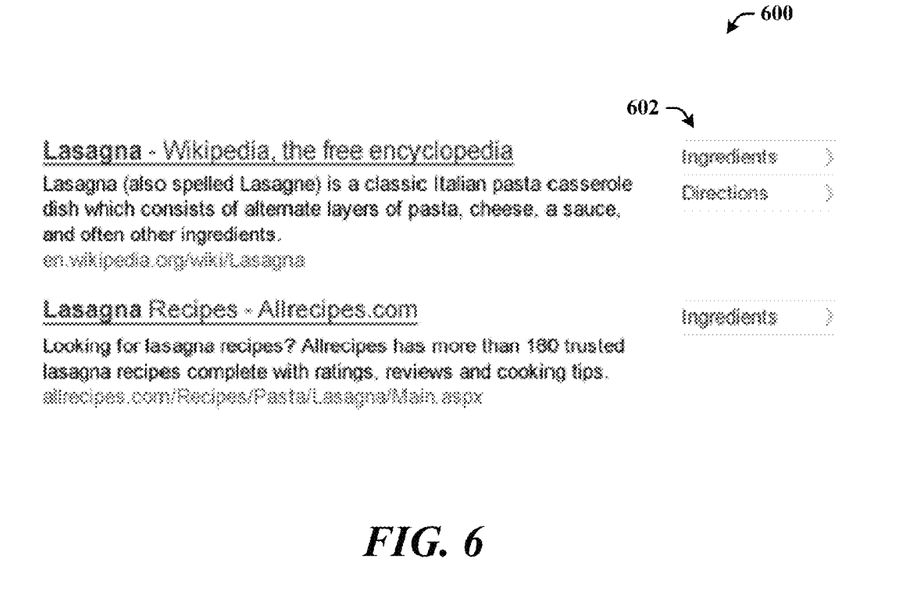
FIG. 6 illustrates search result entries where the label items are presented on the side of the result entries.

FIG. 6 illustrates search result entries 600 where the label items 602 are presented on the side of the result entries 600.

In one implementation, the label items (e.g., expansion objects) can be configured to appear in the following order when available: Ingredients, Directions, Nutrition, Similar Recipe, Popular Recipe, Top Recipe, Newest Recipe, Map, Expert Review, Customer Review, Best Answer, Other Answers, Full Question, and Related Questions.

Figure 7:
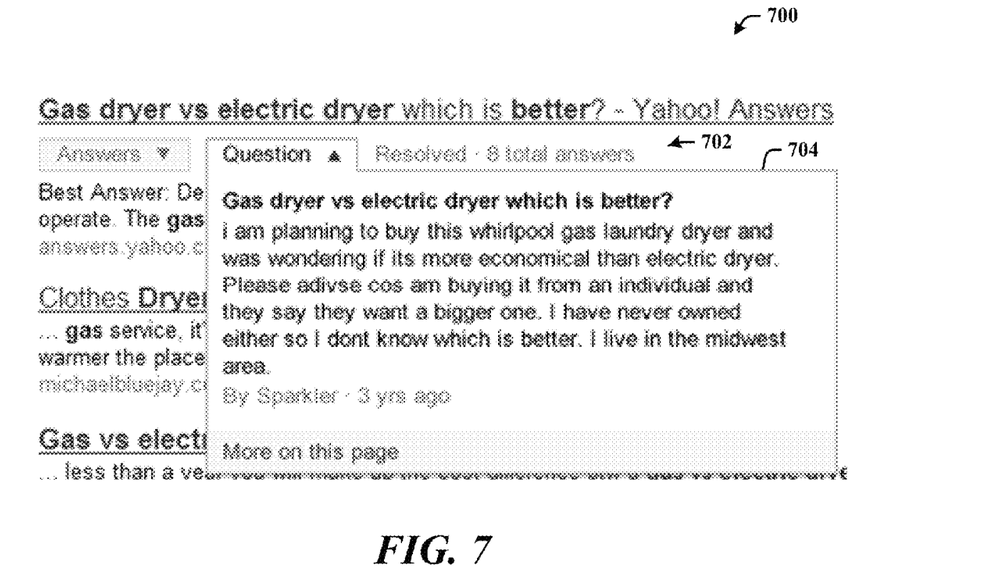
FIG. 7 illustrates a search result entry where the label items are questions and answers.

FIG. 7 illustrates a search result entry 700 where the label items 702 are questions and answers. The expansion object 704 presents data that can include the question and answer, author identification and relative time of the posting, and the actions can include retrieving more information from the target webpage.

Figure 8:
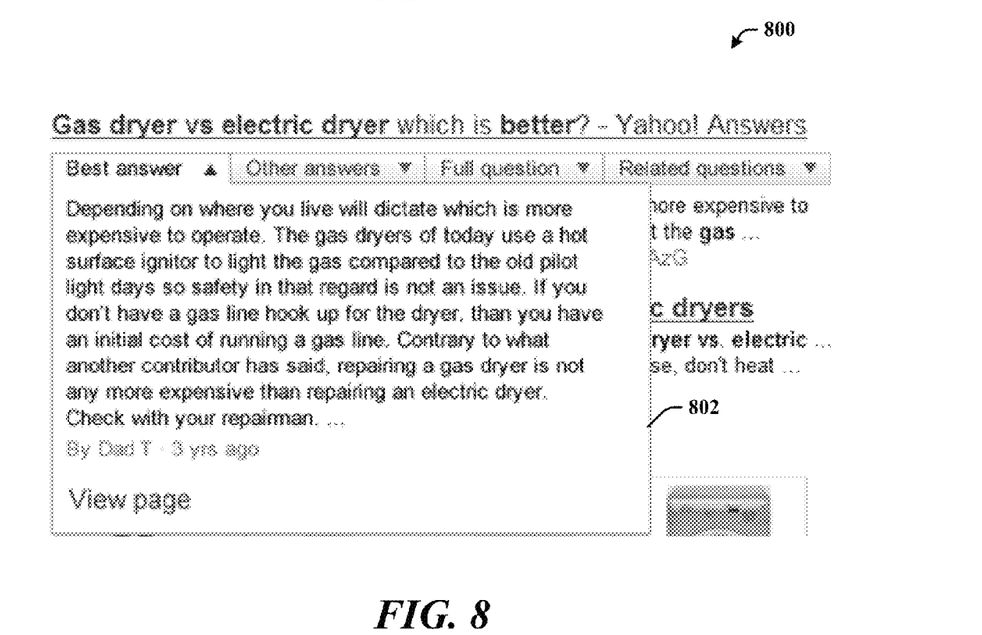
FIG. 8 illustrates a search result entry where the label items are best answer, other answers, the full question, and related questions.

FIG. 8 illustrates a search result entry 800 where the label items are best answer, other answers, the full question, and related questions. The expansion object 802 presents data that can include a best answer, author identification, and relative time of the posting, and the actions can include viewing the target webpage.

Figure 9:
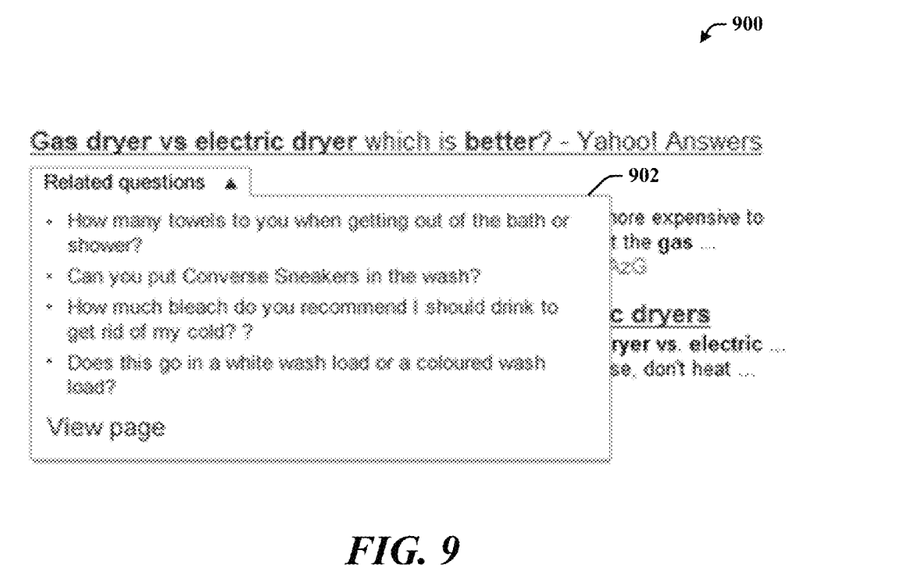
FIG. 9 illustrates a search result entry where the label item is related questions.

FIG. 9 illustrates a search result entry 900 where the label item is related questions. The expansion object 902 (presentation component) presents data that can include related questions, author identification, and relative time of the posting, and the actions can include viewing the target webpage.

Figure 10:
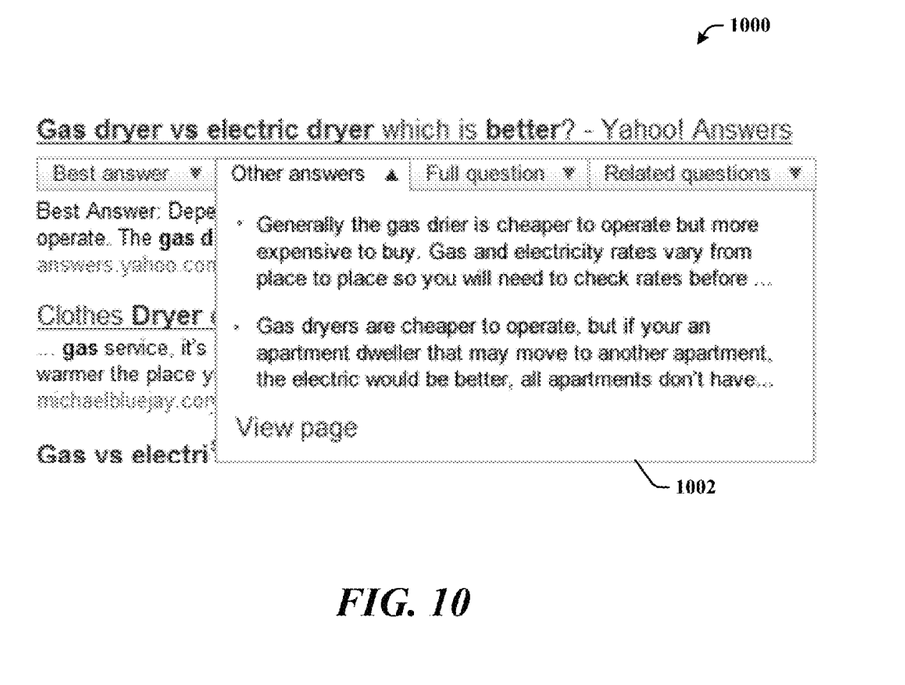
FIG. 10 illustrates a search result entry where the expanded label item is other answers.

FIG. 10 illustrates a search result entry 1000 where the expanded label item is other answers. The expansion object 1002 presents data that can include other answers and the actions can include viewing the target webpage.

The disclosed architecture can also include, as described herein, presentation components for recipes, such as steps for making the product, recipe ingredients, the top recipe, new recipe, popular recipe, and nutritional information. Other label items can be utilized that are related to reviews from a customer and experts, as well as maps and addresses, for example.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 11:
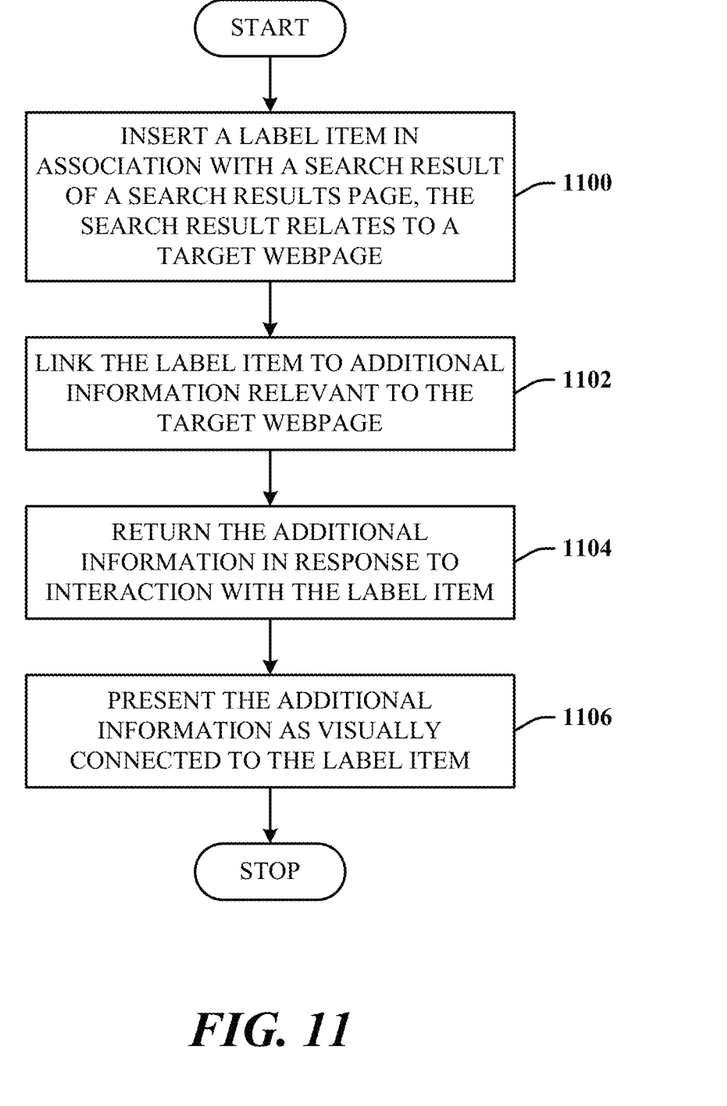
FIG. 11 illustrates computer-implemented method of presenting data and actions in accordance with the disclosed architecture.

FIG. 11 illustrates a computer-implemented method of presenting data and actions in accordance with the disclosed architecture. At 1100, a label item is inserted in association with a search result of a search results page. The search result relates to a target webpage. This relation can include any one or more of content on the webpage, entities of the page, and concepts mentioned on the page. At 1102, the label item is linked to additional information (e.g., data, action) relevant to the target webpage. At 1104, the additional information is returned in response to interaction (e.g., hover, mouse click, etc.) with the label item. At 1106, the additional information is presented (e.g., pop-up, expansion object) as visually connected to the label item.

Figure 12:
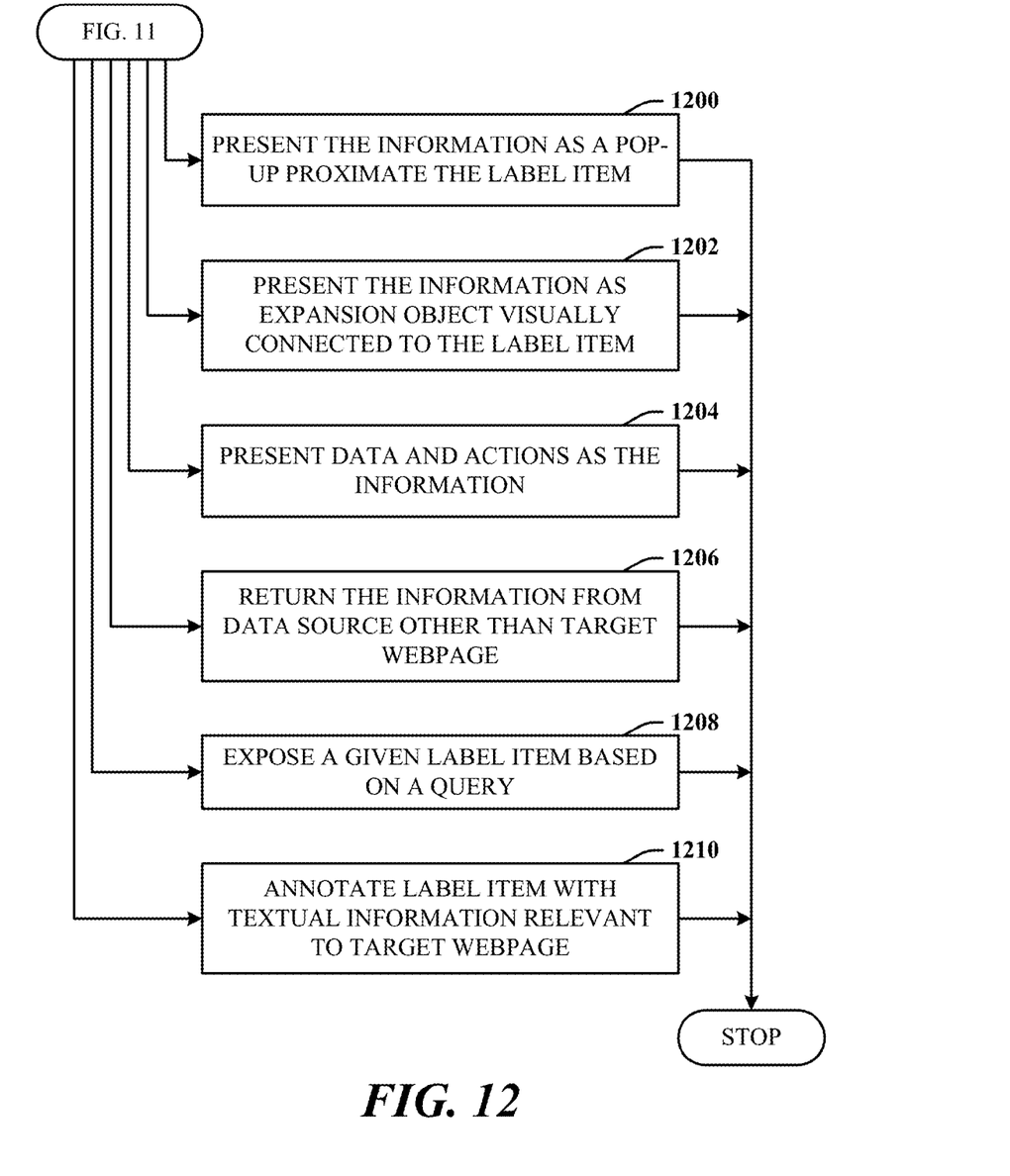
FIG. 12 illustrates further aspects of the method of FIG. 11.

FIG. 12 illustrates further aspects of the method of FIG. 11. Note that the flow indicates that each block can represent a step that can be included, separately or in combination with other blocks, as additional aspects of the method represented by the flow chart of FIG. 11. At 1200, the information is presented as a pop-up proximate the label item. At 1202, the information is presented as an expansion object (a presentation of an increased amount of information that appears to the viewer as being appended to the existing subsnippet of information) visually connected to the label item. At 1204, data and actions are presented as the information. At 1206, the information is returned from a data source other than the target webpage. At 1208, a given label item is exposed based on a query. At 1210, the label item is annotated with textual information (e.g., alphanumeric) relevant to target webpage.

Figure 13:
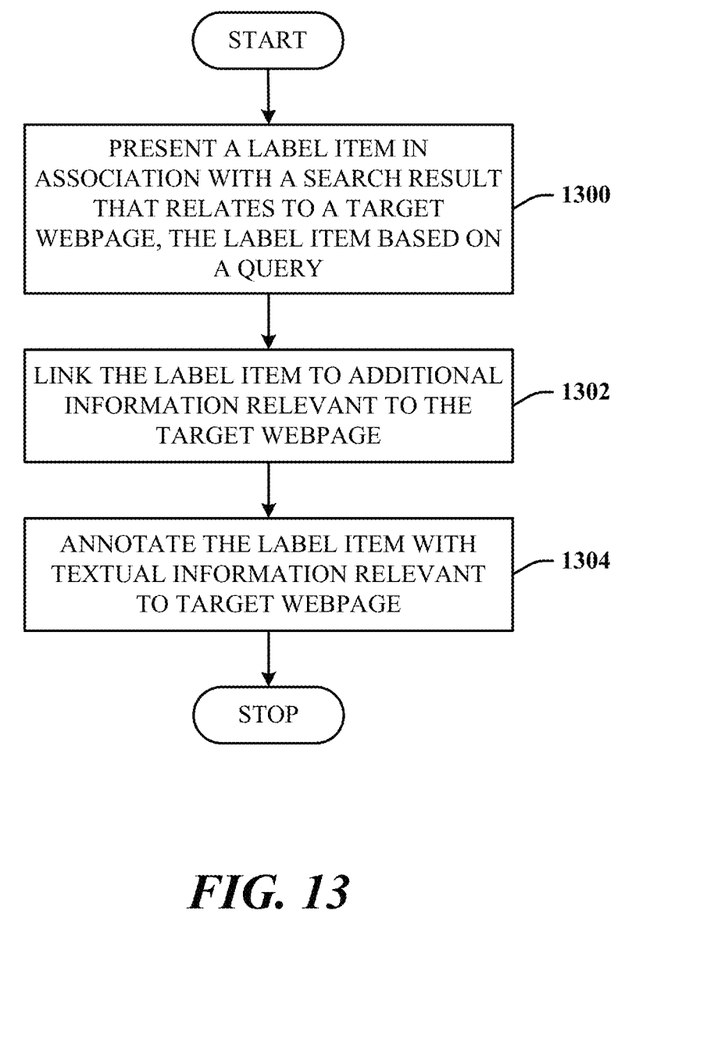
FIG. 13 illustrates an alternative method of presenting data and actions.

FIG. 13 illustrates an alternative method of presenting data and actions. At 1300, a label item is presented in association with a search result that relates to a target webpage. The label item is based on a query. For example, if the query is about restaurants, the label item can be related to a menu, hours of operation, reviews, etc. At 1302, the label item is linked to additional information relevant to the target webpage. At 1304, the label item is annotated with textual information relevant to target webpage.

Figure 14:
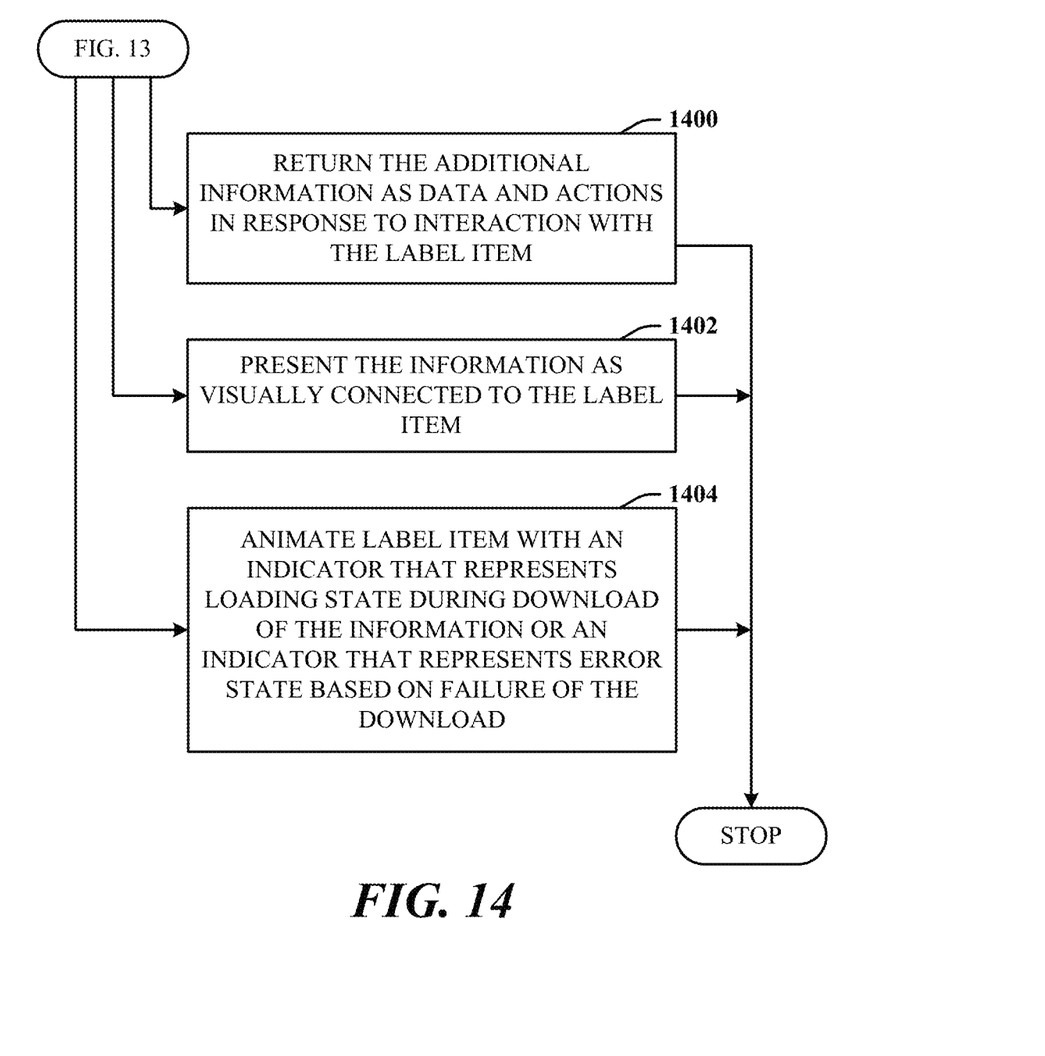
FIG. 14 illustrates further aspects of the method of FIG. 13.

FIG. 14 illustrates further aspects of the method of FIG. 13. Note that the flow indicates that each block can represent a step that can be included, separately or in combination with other blocks, as additional aspects of the method represented by the flow chart of FIG. 13. At 1400, the additional information is returned as data and actions in response to interaction with the label item. At 1402, the information is presented as visually connected (to the side, underneath, etc.) to the label item. At 1404, the label item is animated with an indicator (e.g., spinning image) that represents loading state during download of the information or an indicator that represents error state based on failure of the download.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 15:
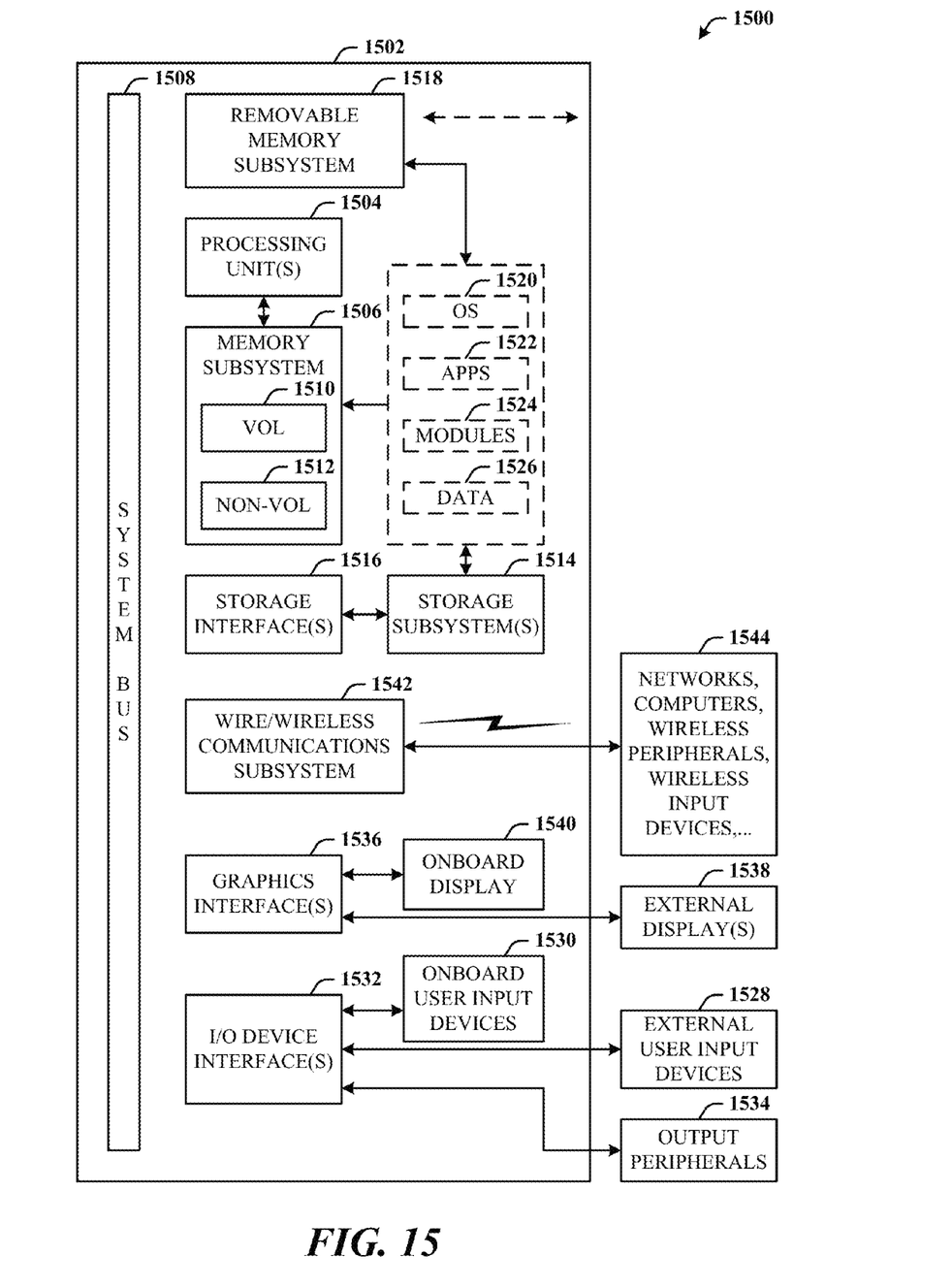
FIG. 15 illustrates a block diagram of a computing system that executes result entry pop-ups and expansion objects in accordance with the disclosed architecture.

Referring now to FIG. 15, there is illustrated a block diagram of a computing system 1500 that executes result entry pop-ups and expansion objects in accordance with the disclosed architecture. However, it is appreciated that the some or all aspects of the disclosed methods and/or systems can be implemented as a system-on-a-chip, where analog, digital, mixed signals, and other functions are fabricated on a single chip substrate. In order to provide additional context for various aspects thereof, FIG. 15 and the following description are intended to provide a brief, general description of the suitable computing system 1500 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 1500 for implementing various aspects includes the computer 1502 having processing unit(s) 1504, a computer-readable storage such as a system memory 1506, and a system bus 1508. The processing unit(s) 1504 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 1506 can include computer-readable storage (physical storage media) such as a volatile (VOL) memory 1510 (e.g., random access memory (RAM)) and non-volatile memory (NON-VOL) 1512 (e.g., ROM, EPROM, EEPROM, etc.). A basic input/output system (BIOS) can be stored in the non-volatile memory 1512, and includes the basic routines that facilitate the communication of data and signals between components within the computer 1502, such as during startup. The volatile memory 1510 can also include a high-speed RAM such as static RAM for caching data.

The system bus 1508 provides an interface for system components including, but not limited to, the system memory 1506 to the processing unit(s) 1504. The system bus 1508 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 1502 further includes machine readable storage subsystem(s) 1514 and storage interface(s) 1516 for interfacing the storage subsystem(s) 1514 to the system bus 1508 and other desired computer components. The storage subsystem(s) 1514 (physical storage media) can include one or more of a hard disk drive (HDD), a magnetic floppy disk drive (FDD), and/or optical disk storage drive (e.g., a CD-ROM drive DVD drive), for example. The storage interface(s) 1516 can include interface technologies such as EIDE, ATA, SATA, and IEEE 1394, for example.

One or more programs and data can be stored in the memory subsystem 1506, a machine readable and removable memory subsystem 1518 (e.g., flash drive form factor technology), and/or the storage subsystem(s) 1514 (e.g., optical, magnetic, solid state), including an operating system 1520, one or more application programs 1522, other program modules 1524, and program data 1526.

The operating system 1520, one or more application programs 1522, other program modules 1524, and/or program data 1526 can include entities and components of the system 100 of FIG. 1, entities and components of the system 200 of FIG. 2, entities and components of the entry 300 of FIG. 3, entities and components of the entry 400 of FIG. 4, entities and components of the entry 500 of FIG. 5, entities and components of the entries 600 of FIG. 6, entities and components of the entries 700 of FIG. 7, entities and components of the entries 800 of FIG. 8, entities and components of the entries 900 of FIG. 9, entities and components of the entries 1000 of FIG. 10, and the methods represented by the flowcharts of FIGS. 11-14, for example.

Generally, programs include routines, methods, data structures, other software components, etc., that perform particular tasks or implement particular abstract data types. All or portions of the operating system 1520, applications 1522, modules 1524, and/or data 1526 can also be cached in memory such as the volatile memory 1510, for example. It is to be appreciated that the disclosed architecture can be implemented with various commercially available operating systems or combinations of operating systems (e.g., as virtual machines).

The storage subsystem(s) 1514 and memory subsystems (1506 and 1518) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 1502 and includes volatile and non-volatile internal and/or external media that is removable or non-removable. For the computer 1502, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 1502, programs, and data using external user input devices 1528 such as a keyboard and a mouse. Other external user input devices 1528 can include a microphone, an IR (infrared) remote control, a joystick, a game pad, camera recognition systems, a stylus pen, touch screen, gesture systems (e.g., eye movement, head movement, etc.), and/or the like. The user can interact with the computer 1502, programs, and data using onboard user input devices 1530 such a touchpad, microphone, keyboard, etc., where the computer 1502 is a portable computer, for example. These and other input devices are connected to the processing unit(s) 1504 through input/output (I/O) device interface(s) 1532 via the system bus 1508, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 1532 also facilitate the use of output peripherals 1534 such as printers, audio devices, camera devices, and so on, such as a sound card and/or onboard audio processing capability.

One or more graphics interface(s) 1536 (also commonly referred to as a graphics processing unit (GPU)) provide graphics and video signals between the computer 1502 and external display(s) 1538 (e.g., LCD, plasma) and/or onboard displays 1540 (e.g., for portable computer). The graphics interface(s) 1536 can also be manufactured as part of the computer system board.

The computer 1502 can operate in a networked environment (e.g., IP-based) using logical connections via a wired/wireless communications subsystem 1542 to one or more networks and/or other computers. The other computers can include workstations, servers, routers, personal computers, microprocessor-based entertainment appliances, peer devices or other common network nodes, and typically include many or all of the elements described relative to the computer 1502. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 1502 connects to the network via a wired/wireless communication subsystem 1542 (e.g., a network interface adapter, onboard transceiver subsystem, etc.) to communicate with wired/wireless networks, wired/wireless printers, wired/wireless input devices 1544, and so on. The computer 1502 can include a modem or other means for establishing communications over the network. In a networked environment, programs and data relative to the computer 1502 can be stored in the remote memory/storage device, as is associated with a distributed system. It will be appreciated that the network connections shown are exemplary and other means of establishing a communications link between the computers can be used.

The computer 1502 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented system, comprising:
a label component presented in association with a search result entry of a plurality of search result entries of a search results page generated in response to a search query, wherein:
each of the plurality of search result entries, including the search result entry, comprises a title, a link to a corresponding webpage, and a snippet of information from the corresponding webpage and related to the search query;

the link to a corresponding webpage of the search result entry comprises a link to a target webpage; and the label component includes one or more label items comprising links to a corresponding one or more additional webpages having information relevant to the target webpage;

a presentation component that launches proximate to a label item in response to interaction with the label item and presents the additional information from the target webpage, wherein the presentation component is a pop-up window or an expansion object that is presented proximate to the associated label item and includes the additional information; and a processor that executes computer-executable instructions associated with at least one of the label component.

2. The system of claim 1, wherein the label component is presented in a metadata line of the search result entry.

3. The system of claim 1, wherein the label items each include a textual descriptor that relates to the additional information to be presented by a presentation component.

4. The system of claim 1, wherein the label items include an animated indicator that represents loading state during download of the additional information.

5. The system of claim 1, wherein the label items include an error indicator that represents error state based on failure of download of the additional information.

6. The system of claim 1, wherein the additional information includes an action related to the search result entry and the target webpage.

7. The system of claim 1, wherein the additional information includes data obtained from a source other than the target webpage.

8. A computer-implemented method, comprising acts of:

accessing a search results page, the search results page being generated in response to a search query and comprising a plurality of search results, wherein each of the plurality of search results comprise a title, a link to a corresponding webpage, and a snippet of information from the corresponding webpage, the snippet of information relating to the search query;

inserting a label item in a search result of the plurality of search results of the search results page as part of the search result, wherein the search result relates to a target webpage;

linking the label item to additional information relevant to the target webpage;

obtaining the additional information in response to interaction with the label item;

presenting the additional information as visually connected to the label item in a pop-up window or in an expansion object located proximate the label item; and utilizing a processor that executes instructions in memory to perform at least one of the acts of accessing, inserting, linking, obtaining, or presenting.

9. The method of claim 8, further comprising presenting data and actions as the information.

10. The method of claim 8, further comprising returning the information from a data source other than the target webpage.

11. The method of claim 8, further comprising exposing a given label item based on a query.

12. The method of claim 8, further comprising annotating the label item with textual information relevant to target webpage.

13. A computer-implemented method, comprising acts of:

accessing a search results page, the search results page being generated in response to a query and comprising a plurality of search results, wherein each of the plurality of search results comprise a title, a link to a related webpage, and a snippet of information, the snippet of information relating to the query;

presenting a label item as part of the search result of the plurality of search results, wherein the search results that relates to a target webpage, wherein the label item presents additional information relevant to the target webpage, and wherein the label item is presented as a pop-up window or as an expansion object located proximate the label item;

linking the label item to the additional information relevant to the target webpage;

annotating the label item with textual information relevant to target webpage; and utilizing a processor that executes instructions in memory to perform at least one of the acts of presenting, linking, or annotating.

14. The method of claim 13, further comprising returning the additional information as data and actions in response to interaction with the label item.

15. The method of claim 13, further comprising presenting the information as visually connected to the label item.

16. The method of claim 13, further comprising animating the label item with an indicator that represents loading state during download of the information or an indicator that represents error state based on failure of the download.

* * * * *